United States Patent [19]
Wang

[11] Patent Number: 5,783,328
[45] Date of Patent: Jul. 21, 1998

[54] METHOD OF TREATING LITHIUM MANGANESE OXIDE SPINEL

[75] Inventor: Enoch I. Wang, Mansfield, Mass.

[73] Assignee: Duracell, Inc., Bethel, Conn.

[21] Appl. No.: 757,055

[22] Filed: Nov. 26, 1996

Related U.S. Application Data

[63] Continuation-in-part of Ser. No. 679,497, Jul. 12, 1996, Pat. No. 5,733,685.

[51] Int. Cl.$^6$ ............................................. H01M 4/50
[52] U.S. Cl. ..................... 429/137; 429/224; 427/126.1
[58] Field of Search ........................... 427/126.1, 377; 423/599; 429/137, 224

[56] References Cited

U.S. PATENT DOCUMENTS

| | | | |
|---|---|---|---|
| 4,828,834 | 5/1989 | Nagaura et al. | 423/599 X |
| 5,135,732 | 8/1992 | Barboux | 423/593 |
| 5,266,299 | 11/1993 | Tarascon | 423/599 |
| 5,370,710 | 12/1994 | Nagaura et al. | 423/599 X |
| 5,425,932 | 6/1995 | Tarascon | 423/599 |
| 5,449,577 | 9/1995 | Dahn | 429/94 |
| 5,597,664 | 1/1997 | Ellgen | 423/599 X |

FOREIGN PATENT DOCUMENTS

| | | |
|---|---|---|
| 93114490.1 | 3/1994 | European Pat. Off. . |
| 0712173 | 5/1996 | European Pat. Off. . |
| 2276155 | 9/1994 | United Kingdom . |
| 2276156 | 9/1994 | United Kingdom . |

OTHER PUBLICATIONS

D.G. Wickham and W.J. Croft. J. Phys. Chem. Solids. vol. 7. p. 351 (1958) (Month Unknown).

*Primary Examiner*—Stephen Kalafut
*Attorney, Agent, or Firm*—Barry D. Josephs; Paul I. Douglas

[57] ABSTRACT

A method of treating lithium manganese oxide of spinel structure is disclosed. The method involves heating the lithium manganese oxide spinel in an atmosphere of an inert gas, e.g., argon, helium, nitrogen or carbon dioxide, which does not react with the spinel. Alternatively, the spinel may be first coated with an alkali metal hydroxide, preferably lithium, sodium or potassium hydroxide and then heated in an atmosphere preferably containing carbon dioxide. Such treatment of lithium manganese oxide spinel improves the performance of the spinel when employed as an electrode in rechargeable cells such as lithium-ion cells. Alternatively, the spinel may be first treated in an aqueous solution of a soluble metal salt of a carboxylic acid prior to treatment with heated carbon dioxide or inert gas. In such latter case the spinel may optionally also be treated with an alkali metal hydroxide prior to treatment with carbon dioxide or inert gas.

20 Claims, No Drawings

METHOD OF TREATING LITHIUM MANGANESE OXIDE SPINEL

This application is a continuation-in-part of patent application Ser. No. 08/679,497 filed Jul. 12, 1996, now U.S. Pat. No. 5,733,685.

This invention relates to a method of treating lithium manganese oxide compound of spinel structure and its use in rechargeable batteries.

The prior art discloses methods of preparing lithium manganese oxide ($Li_xMn_2O_4$) of spinel crystalline structure for use in secondary (rechargeable) batteries. In one prior art method $Li_xMn_2O_4$ spinel powders are prepared by heating a mixture of lithium carbonate and manganese oxide powders in air at temperatures between about 800° C. and 900° C. (D. G. Wickham & W. J. Croft, J.Phys. Chem. Solids, Vol. 7, p.351 (1958)) In another method (U.S. Pat. No. 5,135,732) hydroxides of lithium and ammonium in solution with manganese acetate in a sol-gel colloidal suspension are reacted to yield lithium manganese oxide spinel compound. In still another method lithium carbonate is reacted with manganese acetate to produce lithium manganese oxide spinel precipitate which is dried to produce spinel product (U.K. Patent Application GB 2276155). However, when used in rechargeable cells, such lithium manganese oxide spinel product made by prior art techniques exhibits loss in capacity during cell cycling. Also, such spinel product tends to lose capacity when stored at elevated temperatures between charge/discharge cycles.

The prior art also discloses various methods for treating lithium manganese oxide spinel to improve its performance in rechargeable cells. For example, in European Application No. 93114490.1 a method of treating lithium manganese oxide spinel is described. The method involves heating lithium manganese oxide spinel powder with lithium hydroxide powder in air at elevated temperatures to improve the charge/discharge cycle characteristics. In U.S. Pat. No. 5,449,577 a method is described of treating lithium manganese oxide spinel by heating the spinel in a reducing gas mixture comprising gases such as $NH_3$, $H_2$, and CO to improve the specific capacity of the spinel. The use of such gases imposes difficult handling problems because of their toxicity or combustibility. Such gases are reactive and may contaminate the spinel if the reactions are not carefully monitored.

Now, according to the present invention, improved methods have been discovered to treat lithium manganese oxide spinel which may have been synthesized in any conventional manner, for example, by any of the above referenced prior art methods or the equivalent. Characteristically, the lithium manganese oxide spinel, prior to treatment by the method of the invention, may be represented by the stoichiometric formula $Li_xMn_2O_{4+d}$ (0.9<x<1.2 and 0<d<0.4). (The term "spinel" as used hereinafter shall be construed to mean lithium oxide spinel having the above formula, unless otherwise indicated.)

In accordance with one aspect of the invention lithium manganese oxide spinel powder, preferably having an average particle size of between about 5 and 100 micron, may be treated with an inert, nonreacting gas, which gas remains chemically unaltered during the treatment process. The nonreacting gas may be under atmospheric, elevated or subatmospheric pressure. Such gases are advantageously selected from argon, helium, nitrogen and carbon dioxide. It has been discovered that the spinel may be advantageously treated with such gases at elevated temperatures to improve the performance of the spinel when employed as an electrode in rechargeable cells such as lithium-ion cells.

Advantageously, the lithium manganese oxide spinel may be subjected to treatment in an inert, nonreactive gaseous environment of nitrogen or carbon dioxide at elevated temperature advantageously between about 200° C. and 700° C., preferably between 200° C. and 500° C. for a period between about 1 and 20 hours, preferably between about 2 and 15 hours. (The nitrogen and carbon dioxide remain chemically unaltered during the spinel treatment process at said elevated temperatures.) It has been determined that such treatment of the spinel powder reduces the valence of the manganese in the spinel and improves the specific capacity of the spinel when it is used in rechargeable cells, for example, lithium-ion cells. Additionally, treatment of spinel powder with carbon dioxide tends to improve storability of the spinel when used in rechargeable cells, e.g., lithium-ion cells. (The term "storability" as used hereinafter refers to capacity loss of the spinel during storage between charge/discharge cycles.)

It has been determined that improvement in specific capacity and performance of spinel in rechargeable cells may also be realized by treating the spinel in an inert, nonreactive gaseous atmosphere of helium or argon at temperatures between about 200° C. and 700° C., for a period between 1 and 20 hours. The improvement in specific capacity and performance of spinel in rechargeable cells may also be realized by heating the spinel in nonreactive atmospheres even under vacuum or near vacuum conditions at temperatures between about 200° and 700° C. for a period between 1 and 20 hours.

In another aspect of the invention lithium manganese oxide spinel powder, preferably having an average particle size between about 5 and 100 micron, may be first immersed in a lithium hydroxide solution at ambient temperature and the mixture stirred for sufficient time to saturate the spinel powder with hydroxide. The solution is heated to evaporate substantially all the water contained therein leaving behind lithium hydroxide coated particles which may contain some residual moisture. The lithium hydroxide coated spinel may then be exposed to an environment of carbon dioxide at temperature between about 200° and 700° C., preferably between 200° and 500° C. for a period between about 1 and 20 hours, preferably between 2 and 15 hours. Such treatment removes any residual moisture from the spinel and improves the performance of the spinel in rechargeable cells. Specifically, when the carbon dioxide treated, lithium hydroxide coated spinel is used as the positive electrode in rechargeable cells, for example, lithium-ion cells, the spinel exhibits improved storability at elevated temperature (less capacity loss upon cell storage between cycles) and improved specific capacity without increasing fading (capacity loss during cycling) when compared to untreated spinel or spinel treated with LiOH and then heated in air. (The term "fading" as used hereinafter shall refer to the capacity loss of spinel during cycling.)

In another aspect of the invention the spinel powder may be first treated with other hydroxides instead of or in addition to lithium hydroxide (LiOH), for example, potassium hydroxide (KOH) or sodium hydroxide (NaOH) or any mixture thereof and then posttreated at elevated temperatures in carbon dioxide gas or in air. The posttreatment in air or carbon dioxide of the hydroxide treated spinel is advantageously carried out at temperatures between about 200° C. and 700° C. LiOH coated spinels when posttreated at elevated temperatures, e.g., between about 200° C. and 450° C. in air alone, tends to lose capacity as a result of lithium ions ($Li^+$) diffusing into the spinel, thus forming the low capacity lithium rich $Li_{1+x}Mn_2O_4$ phases. However, if the posttreatment at elevated temperatures is carried out in $CO_2$ instead of air, the LiOH coating is converted to form a rich $Li_2CO_3$ coating on the spinel surface instead of forming the lithium rich $Li_{1+x}Mn_2O_4$ phases. However, it has been determined that when the spinel is first treated with other hydroxides, i.e., hydroxides other than lithium hydroxide, preferably, NaOH or KOH, the posttreatment process can be carried out in air at temperatures between about 200° C. and 700° C. without loss in specific capacity. (It is theorized that Na+ or K+ ions are too large to diffuse into the spinel structure to cause a capacity loss and therefore treatment of the spinel with NaOH or KOH has been determined to be desirable. There is also some small amount of carbonate formed on the surface of spinel when the spinel is first treated with NaOH or KOH and posttreated in heated air. Such carbonate formation is believed to help achieve performance improvement of the spinel in rechargeable lithium-ion cells.)

Spinel treated first with hydroxides such as lithium hydroxide (LiOH) or non-lithium hydroxide, e.g., NaOH or KOH, and then treated in an inert, nonreacting atmosphere of carbon dioxide ($CO_2$) at temperatures between about 200° C. and 700° C., leads to improved overall performance and improved storability of the spinel in rechargeable cells such as lithium-ion cells. Preferred hydroxides for treatment of spinel which are subsequently treated with carbon dioxide at said elevated temperatures are alkali metal hydroxides which may be selected from LiOH, NaOH, KOH, RbOH, CsOH or alkaline earth metal hydroxides such as $Mg(OH)_2$, $Ca(OH)_2$, $Sr(OH)_2$, $Ba(OH)_2$ or transition metal hydroxides which will form carbonates upon posttreatment with carbon dioxide at the treatment temperature. Examples of suitable transition metal hydroxides are $Co(OH)_2$, $Ni(OH)_2$ or $Zn(OH)_2$. Spinel particles treated first with hydroxides of lithium, potassium or sodium or with any of the above described hydroxides or mixtures thereof and then with carbon dioxide in the above described manner form on their surface carbonate coating of between 0.1 and 2 percent by weight, preferably between about 0.4 and 1.5 percent by weight of the coated spinel. It is believed that such carbonate coating improves the storability (less capacity loss upon storage) of the spinel between cycles in rechargeable cells such as lithium-ion cells.

In addition to hydroxides, other carbonate-forming precursors may also be coated on spinels and posttreated in $CO_2$ or inert gases such as nitrogen, argon, and helium. It has been determined that water soluble metal salts of carboxylic acids (metal carboxylates) preferably soluble transition metal salts of carboxylic acids may be advantageously coated onto lithium manganese oxide spinel particles by immersing the spinel particles in aqueous solutions containing the metal salt of a carboxylic acid. (The transition metals include elements from groups IIIb, IVb, Vb, VIb, VIIb, VIII, Ib, and IIb of the periodic table.) The solution is then heated to boil off water therefrom leaving behind a wet metal carboxylate salt coating on the spinel particles. The carboxylate coated spinel particles are then further heated to remove all excess water leaving behind a dry metal carboxylate coating on the particles. Preferably, carbon dioxide gas (alternatively, inert gases such as nitrogen, argon or helium,) at a temperature of between about 200° C. and 700° C., preferably between 200° C. and 400° C., more preferably about 300° C. is passed through the coated spinel particles for a period preferably between about 1 and 20 hours. (Although heating in carbon dioxide gas is preferred, the carbon dioxide gas may be diluted with air.) The carboxylate coating thereupon decomposes to form either or both metal oxides and metal carbonates on the surface of the spinel particles. Preferred soluble metal salts which may be used to pretreat the spinel particle as above described include but are not limited to soluble metal salts of acetic acid, benzoic acid, lactic acid, oxalic acid and formic acid. Specific preferred salts may be selected from manganese, nickel, cobalt, iron, zinc, silver and copper salts of acetic acid; manganese, cobalt, zinc and silver salts of benzoic acid; manganese, iron, silver and copper salts of lactic acid; manganese, nickel, cobalt, and iron salts of oxalic acid; and copper, iron, cobalt, nickel, manganese, zinc, and lead salts of formic acid. More preferred salts are transition metal acetates, e.g. cobalt acetate, which are soluble in water to provides a very effective coating solution into which the spinel can be easily immersed. It has been determined that greater reduction in irreversible capacity loss of the spinel under 60° C. storage of the spinel in discharge state is achieved with a transition metal salt of acetic acid, e.g., cobalt acetate, as compared to an alkali metal salt of acetic acid, e.g., lithium acetate.

When the lithium manganese oxide spinel particles are first coated with the above referenced soluble metal salts of carboxylic acid and subsequently heated in an atmosphere of carbon dioxide or inert gases such as argon, nitrogen and helium, great reduction in irreversible capacity loss of the spinel is observed when the spinel is stored in the discharge state at elevated temperature (60° C.). The precoating of spinel with metal salts of carboxylic acid does not appear to noticeably reduce the irreversible capacity loss of the spinel when stored at 60° C. in the charged state. On the other hand pretreatment of spinel involving precoating the spinel with an alkali metal hydroxide followed by heating the pretreated spinel in an atmosphere of carbon dioxide or air at temperatures between about 200° C. and 400° C. reduces the spinel irreversible capacity loss upon 60° C. storage both when the spinel is stored in charged or discharged state. However, a greater reduction and even elimination of irreversible capacity loss under 60° C. storage condition of spinel in discharged state is obtained when the spinel is pretreated with the above mentioned salts of carboxylic acids followed by treatment with heated carbon dioxide.

A preferred treatment of spinel may also involve precoating the spinel with both an alkali metal hydroxide, e.g., lithium hydroxide and a soluble metal salt of carboxylic acid, e.g., a water soluble transition metal salt of a carboxylic acid such as cobalt acetate. This may be accomplished either in a single step with metal hydroxide and metal salt of a carboxylic acid both present in the same solution or two separate steps with the metal hydroxide present in one solution and the metal salt of a carboxylic acid present in another solution. The precoated spinel is then heated in an atomosphere of carbon dioxide (alternatively, in an inert gas such as argon, helium or nitrogen) at temperature between about 200° C. and 700° C., preferably between about 200° C. and 400° C. Such preferred treatment is set forth in Example 8. This type of dual pretreatment of the spinel greatly reduces both irreversible storage loss (at 60° C.) regardless of whether the spinel is stored in charged or discharged state.

The lithium manganese oxide spinel treated by the methods of the invention has particular utility as active material for the positive electrode of lithium-ion rechargeable cells. Lithium-ion cells are characterized by lithium ions ($Li^+$) transferring from positive to negative electrode during cell charging) and by lithium ions ($Li^+$) transferring from negative back to positive electrode during cell discharge. Such cells are not limited to but may advantageously employ carbon or graphite or metal oxides such as $SnO_2$, $SnO$, $SiO_2$, or SiO for the negative electrode (which becomes intercalated with lithium ion during charging). The electrolyte for such cells comprises a lithium salt, for example, $LiPF_6$, in an aprotic organic solvent, for example, solvents containing ethylene carbonate (EC), propylene carbonate (PC) or dimethyl carbonate (DMC).

In carrying out preferred embodiments of the invention the lithium manganese oxide spinel is ground to a powder, advantageously, between about 5 and 100 micron average particle size. The spinel powder may then be subjected to treatment by placing it in an environment of an inert gas, preferably nitrogen or carbon dioxide gas at elevated temperature between about 200° C. and 700° C. for a period between about 2 an 15 hours. The spinel treatment may be conveniently accomplished on a laboratory scale by placing the spinel powder in an open tray and inserting the tray within a tube and then passing the nitrogen or carbon dioxide gas at temperatures between about 200° and 700° C. through the tube. (The spinel treatment may be conveniently accomplished on a commercial scale by allowing spinel powder to pass down the surface of a rotary kiln as the heated gas, e.g. nitrogen or carbon dioxide gas at temperatures between about 200° and 700° C. is passed in countercurrent direction.) The tube and tray or rotary kiln surface, if employed, may be composed of any heat stable material, for example alumina ($Al_2O_3$) or stainless steel, as long as it does not deform or react with the spinel when exposed to the heated gas over the duration of the treatment period. The gas may be passed under laminar or turbulent flow conditions. The gas pressure within the tube may be at about atmospheric pressure but elevated pressures may also be employed. At the end of the treatment, the spinel powder is cooled to room temperature before it is removed from the treatment tube to avoid reoxidation.

In carrying out an alternative preferred embodiment, the lithium manganese oxide spinel powder may be first treated by immersing it in an aqueous hydroxide solution, preferably an alkali metal hydroxide, e.g., sodium hydroxide (NaOH), potassium hydroxide (KOH), or lithium hydroxide (LiOH). The immersion of spinel powder in hydroxide solution may be carried out in a heated hydroxide solution or under ambient conditions. After immersion in the hydroxide solution, the solution is then heated to remove water therefrom leaving behind a wet lithium hydroxide coating on the spinel particles. The spinel particles may then be heated on a hot surface to remove all excess water leaving behind a dry hydroxide coating on the particles. Thereupon, the hydroxide coated spinel may be subjected to treatment with carbon dioxide ($CO_2$) gas at temperatures between about 200° and 700° C. in the above described manner forming a carbonate coating on the surface of the spinel.

In carrying out another alternative preferred embodiment the lithium manganese oxide spinel powder may be first treated by mixing the powder into an aqueous solution containing a soluble metal salt of a carboxylic acid. (Preferred salts are water soluble transition metal salts of carboxylic acids.) The solution is then heated to boil off water leaving behind a wet metal carboxylate salt coating on the spinel particles. The carboxylate coated spinel particles are then further heated to remove all excess water leaving behind a dry metal carboxylate coating on the particles. Carbon dioxide gas (alternatively, an inert gas such as argon, helium or nitrogen) at a temperature between about 200° C. and 700° C., preferably between about 200° C. and 400° C. is passed through the coated spinel particles for a period preferably between about 1 and 20 hours. Alternatively, the spinel particles may be coated with both an alkali metal hydroxide, e.g. lithium hydroxide and a soluble metal salt of a carboxylic acid, e.g. cobalt acetate, by immersing the spinel particles in aqueous solutions containing the alkali metal hydroxide and metal salt prior to treatment with heated carbon dioxide or air.

Specific embodiments of the invention are reflected in the following representative examples:

EXAMPLE 1

The following example illustrates the treatment of lithium manganese oxide spinel in an atmosphere of heated nitrogen gas:

Lithium manganese oxide spinel having the stoichiometric formula $Li_{1.05}Mn_2O_{4.2}$ is ground to a powder having an average particle size of about 50 micron. The spinel powder is placed in an open stainless steel tray which is inserted into an alumina ($Al_2O_3$) tube of 4 inch (10.2 cm.) diameter. Nitrogen gas at a temperature between 300° C. and 700° C. at about atmospheric pressure is passed through the tube and contacts the spinel as it passes. The nitrogen is passed at a flow rate of about 1 liter/min. The spinel within the tube is exposed to the heated nitrogen flow for a period which may be varied between 5 and 15 hours. At the end of the treatment, the spinel powder is cooled to room temperature before it is taken out of the tube to avoid re-oxidation. After treatment with heated nitrogen, the spinel samples are analyzed for lithium, manganese and oxygen content. It has been determined that the treatment of spinel in heated nitrogen lowers the spinel oxygen content and reduces the manganese, i.e. lowers the manganese valence. The specific capacity of the spinel when employed in rechargeable cells is improved.

Spinel samples each having the same stoichiometric formula $Li_{1.05}Mn_2O_{4.2}$ are treated in the above manner with nitrogen at different conditions as summarized in Table 1. An untreated spinel (Sample 1A) is given in Table 1 for comparison purposes. The specific-capacities (milliAmp-hr/g) of the treated and untreated spinel samples are determined by employing the spinel material in rechargeable (secondary) cells. A lithium coin cell is constructed by forming its positive electrode from each of the treated or untreated spinel samples referenced in Table 1. In each case the positive electrode of the cell is formed from a mixture of spinel (60 wt.%), carbon (35 wt.%) and Teflon (tetrafluoroethylene) (5 wt%). The mixture is compressed and 167 milligrams of the compressed mixture is utilized as positive electrode material. The negative electrode of each coin cell is metallic lithium and the electrolyte is of 1 molar $LiPF_6$ (lithium hexaflurophosphate) in equal parts by volume of ethylene carbonate (EC) and dimethyl carbonate (DMC) solvent. Each of the prepared coin cells is subjected to cycling (charge/discharge) tests wherein the cells are cycled between 4.3 Volts and 3.0 Volts at a current density of 0.5 milliAmp/cm2. As shown in Table 1 in each case the specific capacity of the nitrogen treated spinel improved over that of untreated spinel (Sample 1A). (The spinel specific capacities shown in Table 1 are averaged over 5 cycles.)

TABLE 1

| Sample | Spinel Treatment Conditions with $N_2$ | Spinel Capacity, milliAmp/gm (average over 5 cycles) |
|---|---|---|
| 1A | No $N_2$ Treatment | 108 |
| 1B | $N_2$ @ 600° C. for 5 hrs. | 117 |

TABLE 1-continued

| Sample | Spinel Treatment Conditions with $N_2$ | Spinel Capacity, milliAmp/gm (average over 5 cycles) |
| --- | --- | --- |
| 1C | $N_2$ @ 650° C. for 5 hrs. | 118 |
| 1D | $N_2$ @ 650° C. for 10 hrs. | 118 |
| 1E | $N_2$ @ 650° C. for 24 hrs. | 110 |

EXAMPLE 2

The following example illustrates the treatment of lithium oxide spinel in an atmosphere of heated carbon dioxide gas:

Spinel having the stoichiometric formula $Li_{1.05}Mn_2O_{4.2}$ is ground to a powder having an average particle size of about 50 micron. The spinel powder is placed in an open stainless steel tray which is inserted into an alumina ($Al_2O_3$) tube of 4 inch (10.2 cm.) diameter. Carbon dioxide gas at a temperature between 200° C. and 700° C. at about atmospheric pressure is passed through the tube and contacts the spinel as it passes. The carbon dioxide is passed at a flow rate of about 1 liter/min. The spinel within the tube is exposed to the flow of heated carbon dioxide for a period which may be varied between 2 and 15 hours. At the end of the treatment, the spinel powder is cooled to room temperature before it is taken out of the tube to avoid re-oxidation. It has been determined that the treatment of spinel in heated carbon dioxide reduces the manganese to a lower valence. The specific capacity of the spinel when employed in rechargeable cells is improved. Also, the treatment with carbon dioxide has been determined to improve the storability (less capacity loss upon storage) of the spinel at elevated temperature.

Spinel samples each having the same stoichiometric formula $Li_{1.05}Mn_2O_{4.2}$ are treated with carbon dioxide in the above manner at different conditions as summarized in Table 2. An untreated spinel (Sample 2A) is given in Table 2 for comparison purposes. The specific capacities (milliAmp-hr/g) of the treated and untreated spinel samples are determined by employing the spinel material in rechargeable (secondary) cells. A lithium coin cell is constructed by forming its positive electrode from each of the treated or untreated spinel samples referenced in Table 2. In each case the positive electrode of the cell is formed from a mixture of spinel (60 wt.%), carbon (35 wt.%) and Teflon (tetrafluoroethylene) (5 wt%). The mixture is compressed and 167 milligrams of the compressed mixture is utilized as positive electrode material. The negative electrode of each coin cell is metallic lithium and the electrolyte is of 1 molar $LiPF_6$ in equal parts by volume of ethylene carbonate (EC)and dimethyl carbonate (DMC) solvent. Each of the prepared coin cells is subjected to cycling (charge/discharge) tests wherein the cells are cycled between 4.3 Volts and 3.0 Volts at a current density of 0.5 milliAmp/cm$^2$.

As shown in Table 2, in each case the specific capacity of the carbon dioxide treated spinel improved over that of untreated spinel (Sample 2A). (The spinel specific capacities shown in Table 2 are averaged over 5 cycles.) Also, as shown in Table 2 the storability of the carbon dioxide treated spinel is improved over the untreated spinel, i.e. the carbon dioxide treated spinel shows less capacity loss than the untreated spinel when the cells are stored at elevated temperature. (The storability data is obtained form lithium-ion coin cells having a graphite or carbon negative electrode (which becomes lithiated upon cell charging), a positive electrode of treated or untreated spinel, and an electrolyte of $LiPF_6$ in equal parts by volume of ethylene carbonate (EC) and dimethy carbonate (DMC) organic solvent. These cells are stored for week at 60° C. between charge/discharge cycles.) Specifically, the capacity loss of the spinel in the lithium cells after one week storage at 60° C. is reduced from 19% to about 8% when the spinel is treated with heated carbon dioxide as above described. The storability improves regardless of whether the cells are stored before discharge or at any time between a charge/discharge cycle.)

TABLE 2

| Sample | Spinel Treatment Conditions with $CO_2$ | Spinel Capacity, milliAmp – hr/gm (average over 5 cycles) | Spinel Capacity Loss (%) After 1 Week at 60° C. |
| --- | --- | --- | --- |
| 2A | No $CO_2$ Treatment | 109.5 | 19% |
| 2B | $CO_2$ at 400° C. for 15 hrs. | 117.5 | Not Measured |
| 2C | $CO_2$ at 500° C. for 15 hrs. | 115 | Not Measured |
| 2D | $CO_2$ at 600° C. for 2 hrs. | 119 | Not Measured |
| 2E | $CO_2$ at 600° C. for 15 hrs. | 115 | 7.7% |

EXAMPLE 3

The following example illustrates treatment of spinel with lithium hydroxide followed by treatment with heated carbon dioxide:

Spinel having the stoichiometric formula $Li_{1.05}Mn_2O_{4.2}$ is ground to a powder having an average particle size of 50 micron. Samples of the spinel powder are stirred into a lithium hydroxide (LiOH) solution under ambient conditions. The mixture is stirred for several minutes until the spinel powder is saturated with hydroxide solution. The molar ratio of spinel to lithium hydroxide in the solution is 0.09. The solution is then heated to remove water from the solution leaving behind a wet lithium hydroxide coating on the spinel particles. The spinel particles are then heated on a hot plate to remove all excess water leaving behind a dry lithium hydroxide coating on the particles. The dry lithium hydroxide coated spinel powder is then placed in an open stainless steel tray which is inserted into an alumina ($Al_2O_3$) tube of 4 inch (10.2 cm.) diameter. Carbon dioxide gas at a temperature between 200° C. and 600° C. at about atmospheric pressure is passes through the tube and contacts the lithium hydroxide coated spinel particles. The carbon dioxide is passed at a flow rate of about 1 liter/min. The spinel within the tube is exposed to the flow of heated carbon dioxide for a period which may be varied between 2 and 15 hours. At the end of the treatment, the spinel powder is cooled to room temperature before it is taken out of the tube to avoid re-oxidation.

A comparison sample (Sample 3A—Table 3) is prepared by immersing spinel powder of same above referenced stoichiometric formula and same average particle size in a solution of lithium hydroxide at 370° C. for 20 hours to coat the spinel particles with lithium hydroxide. This sample is not subsequently treated with carbon dioxide, but instead is subsequently heated in air in a furnace at a temperature between about 200° C. and 450° C. for a period of about 20 hours to remove any residual moisture entrapped in the spinel. A second comparison sample (Sample 4A—Table 4) is prepared employing untreated spinel powder, i.e., spinel of same above referenced stoichiometric formula and same average particle size which has neither been posttreated with hydroxide nor carbon dioxide nor any other substance.

Another sample (Sample 3B—Table 3) is prepared by first coating spinel powder of the above referenced stiochiometric formula (average particle size 50 micron) with lithium hydroxide in the manner above described to form a lithium hydroxide coated spinel powder and then heating the lithium hydroxide coated spinel in an atmosphere of carbon dioxide at 300° C. for 15 hours. Another sample (Sample 3C) is prepared by first coating spinel powder with lithium hydroxide in the manner above described to form a lithium hydroxide coated spinel and then heating the lithium hydroxide coated spinel in an atmosphere of carbon dioxide at 400° C. for 15 hours.

The specific capacities (milliAmp-hr/g), storability (capacity loss upon storage at 60° C.) and fading (capacity loss, milliAmp-hr/g, upon cycling averaged over 50 cycles) of the samples are determined by employing the spinel material in rechargeable cells. A lithium coin cell is constructed by forming its positive electrode from each of the above referenced samples. In each case the positive electrode of the cell is formed from a mixture of spinel (60 wt.%), carbon (35 wt.%) and Teflon (tetrafluoroethylene) (5 wt.%). The mixture is compressed and 167 milligrams of the compressed mixture is utilized as positive electrode material. The negative electrode of each coin cell is metallic lithium and the electrolyte is of 1 molar $LiPF_6$ in equal parts by volume of ethylene carbonate and dimethyl carbonate solvent. Each of the prepared coin cells is subjected to cycling tests wherein the cells are cycled between 4.3 Volts and 3.0 Volts at a current density of 0.5 milliAmp/$cm^2$. As shown in Table 3, the specific capacity of the lithium hydroxide coated spinel which is subsequently treated with carbon dioxide (Samples 3B and 3C) improves over the specific capacity of lithium hydroxide coated spinel not subjected to carbon dioxide treatment (Sample 3A) with essentially no change in fading. Also, as shown in Table 3 the storability (reduction in capacity loss during cell storage at 60° C.) of cells with the carbon dioxide treated lithium hydroxide coated spinel (Samples 3B and 3C) improves over storability of cells employing the lithium hydroxide coated spinel not subjected to carbon dioxide treatment (Sample 3A).

Data is obtained comparing performance of the carbon dioxide treated lithium hydroxide coated spinel (Samples 3B and 3C) and lithium hydroxide coated spinel (Sample 3A) compared to untreated spinel (Sample 4A—Table 4) employed in the same type of rechargeable cells as above described. (That is, spinel not posttreated with any substance (Sample 4A) is substituted for the treated spinel in the above described cells.) A comparison of the data shown in Tables 3 and 4 reveals that storability of cells with lithium hydroxide coated spinel (Sample 3A) improves over storability of untreated spinel (Sample 4A) but that this is at the expense of a decrease in specific capacity of the lithium hydroxide coated spinel (Sample 3A) compared to untreated spinel (Sample 4A). However, cells with carbon dioxide treated lithium hydroxide coated spinel (Samples 3B and 3C) showed improvement in storability as well as improvement in spinel specific capacity when compared to cells employing untreated spinel (Sample 4A). (There is essentially no change in fading among sample 3A, 3B, 3C and 4A.)

TABLE 3

| Sample | Treatment of LiOH Coated Spinel[1] | Spinel Capacity, milliAmp – hr/gm (average over 5 cycles) | Spinel Capacity Loss (%) (after 2 weeks storage at 60° C.) | Fading milliAmp – hr/gm (average over 50 cycles) |
|---|---|---|---|---|
| 3A | No $CO_2$ Treatment (Heated in air)[1] | 100. | 20% | 0.12 |
| 3B | $CO_2$ at 300° C. for 15 hrs. | 115.5 | 14% | 0.13 |
| 3C | $CO_2$ at 400° C. for 15 hrs. | 116. | 15% | 0.15 |

Notes:
[1]Spinel samples 3A, 3B, and 3C are first coated with lithium hydroxide (LiOH). Sample 3A after treatment with LiOH is heated in air at 200° C. to 450° C. Samples 3B and 3C are subsequently also treated with carbon dioxide ($CO_2$) at the conditions shown.

TABLE 4

| Sample | Treatment of Spinel | Spinel Capacity (milliAmp/gm) (average over 5 cycles) | Spinel Capacity Loss (%) (after 2 weeks storage at 60° C.) | Fading, milliAmp/gm (average over 50 cycles) |
|---|---|---|---|---|
| 4A | No Treatment | 110. | 40% | 0.13 |

EXAMPLE 4

The following example illustrates treatment of spinel with sodium or potassium hydroxides followed by treatment with heated carbon dioxide:

Spinel having the stoichiometric formula $Li_{1.05}Mn_2O_{4.2}$ is ground to a powder having an average particle size of 50 micron. Samples of the spinel powder are stirred into a sodium hydroxide (NaOH) or potassium hydroxide (KOH) solution under ambient conditions to saturate the spinel powder with hydroxide solution. The molar ratio of spinel to hydroxide in the solution is 0.09. The solution is then heated to boil off water from the solution leaving behind a wet hydroxide coating on the spinel particles. The spinel particles are then heated on a hot plate to remove all excess water leaving behind a dry hydroxide coating on the particles. The dry hydroxide coated spinel powder is then placed in an open stainless steel tray which is inserted into an alumina ($Al_2O_3$) tube of 4 inch (10.2 cm.) diameter. Carbon dioxide gas at a temperature between about 200° C. and 450° C. at about atmospheric pressure is passed through the tube and contacts the lithium hydroxide coated spinel particles. (The carbon dioxide gas may be at a temperature of between 200° C. an 700° C.. when it contacts the spinel particles.) The carbon dioxide is passed at a flow rate of about 1 liter/min. The spinel within the tube is exposed to the flow of heated carbon dioxide for a period of about 15 to 20 hours. (Spinel contact with the heated carbon dioxide may advantageously be between about 1 and 20 hours.) At the end of the treatment, the spinel powder is cooled to room temperature before it is taken out of the tube to avoid re-oxidation. The NaOH treated spinel subsequently treated with $CO_2$ is reported as Sample 5B (Table 5) and the KOH treated spinel subsequently treated with $CO_2$ is reported as Sample 5C.

A comparison sample (5A in Table 5) is prepared by immersing spinel powder of same above referenced stoichiometric formula and same average particle size in a solution of lithium hydroxide at ambient conditions to coat the spinel particles with lithium hydroxide and then heating the solution to boil off water leaving behind a wet lithium hydroxide coating on the particles. This sample is then subsequently treated with heated carbon dioxide under the conditions above described.

Performance data of for the spinel samples 5A–5C are obtained in rechargeable cells constructed as described in Example 3. It is apparent from Table 5 that NaOH or KOH coated spinels are as effective as or better than the LiOH coated spinels in reducing the irreversible capacity loss upon 60° C. storage without much difference in fading and only slightly lower specific capacity (<5%) when compared to LiOH coated spinels.

molar ratio of spinel to hydroxide in the solution is 0.09. The solution is then heated to boil off and remove water from the solution leaving behind a wet hydroxide coating on the spinel particles. The spinel particles are then heated on a hot plate to remove all excess water leaving behind a dry hydroxide coating on the particles. The dry hydroxide coated spinel powder is then placed in alumina crucibles and heated in air at temperature of between about 200° C. and 450° C. for a period of about 20 hours. The heated spinel (in air) which was treated with NaOH forms Sample 6B (Table 6) and the heated spinel (in air) which was treated with KOH forms Sample 6C.

A comparison sample (6A in Table 6) is prepared by immersing spinel powder of same above referenced stoichiometric formula and same average particle size in a solution of lithium hydroxide at ambient temperature to coat the spinel particles with lithium hydroxide and then heated to boil off water from the solution leaving behind a wet lithium hydroxide coating on the particles. This sample is then subsequently treated in air at a temperature between about 200° C. and 450° C. for about 20 hours. (The air may be at a temperature of between about 200° C. an 700° C. when it contacts the spinel particles.)

Performance data of for the spinel samples 6A–6C are obtained in rechargeable cells constructed as described in Example 3. The performance data is reported in Table 6. It

TABLE 5

| Sample | Types of Hydroxide Coated Spinels[1] | Spinel Capacity (milliAmp – hr/gm) (first cycle) | Spinel Capacity Loss (%) (after 1 week storage at 60° C.) | Fading, milliAmp – hr/gm (average over 50 cycles) |
|---|---|---|---|---|
| 5A | LiOH | 127.3 | 12.3 | 0.1 |
| 5B | NaOH | 123 | 11.8 | 0.12 |
| 5C | KOH | 122 | 10.2 | 0.13 |

Notes:
[1]After hydroxide treatment all spinels were subsequently treated at the same temperature between about 200° C. and 450° C. for 20 hours in carbon dioxide.

EXAMPLE 5

The following example illustrates treatment of spinel with sodium or potassium hydroxides followed by treatment with heated air:

Spinel having the stoichiometric formula $Li_{1.05}Mn_2O_{4.2}$ is ground to a powder having an average particle size of 50 micron. Samples of the spinel powder are stirred into a sodium hydroxide (NaOH) or potassium hydroxide (KOH) solution under ambient conditions for several minutes to saturate the spinel powder with hydroxide solution. The is apparent from table 6 that air heated NaOH or KOH coated spinels had higher capacity than air heated LiOH coated spinels. Moreover, NaOH or KOH coated spinels are as effective as or better than LiOH coated spinels in reducing the irreversible capacity loss upon 60° C. storage. The degree of fading, i.e., capacity loss averaged over 50 cycles, remained about the same irrespective of the hydroxide used to treat the spinel.

TABLE 6

| Sample | Types of Hydroxide Coated Spinels[1] | Spinel Capacity (milliAmp – hr/gm) (first cycle) | Spinel Capacity Loss (%) (after 1 week storage at 60° C.) | Fading, milliAmp – hr/gm (average over 50 cycles) |
|---|---|---|---|---|
| 6A | LiOH | 116 | 14 | 0.1 |
| 6B | NaOH | 121 | 11 | 0.13 |
| 6C | KOH | 124 | 9 | 0.13 |

Notes:
[1]After hydroxide treatment all spinels were subsequently treated at the same temperature between about 200° C. and 450° C. for 20 hours in air.

EXAMPLE 7

The following example illustrates treatment of spinel with lithium acetate or cobalt acetate followed by treatment with heated carbon dioxide:

Spinel having the stoichiometric formula $Li_{1.05}Mn_2O_{4.2}$ is ground to a powder having an average particle size of 50 micron. One sample of the spinel powder is stirred into a cobalt acetate solution under ambient conditions to saturate the spinel powder with acetate solution. Another sample of spinel powder is stirred into a lithium acetate solution in like manner under ambient conditions to saturate the spinel. The molar ratio of spinel to acetate in the solution in each case is 0.09. Each of the sample solutions is then heated to boil off water from the solution leaving behind a wet acetate coating on the spinel particles. The spinel particles are then heated on a hot plate to remove all excess water leaving behind a dry acetate coating on the particles. The dry acetate coated spinel powder is then placed in an open stainless steel tray which is inserted into an alumina ($Al_2O_3$) tube of 4 inch (10.2 cm.) diameter. Carbon dioxide gas at a temperature between about 200° C. and 450° C. at about atmospheric pressure is passed through the tube and contacts the acetate coated spinel particles. (The carbon dioxide gas may be at a temperature of between 200° C. an 700° C., when it contacts the spinel particles.) The carbon dioxide is passed at a flow rate of about 1 liter/min. The spinel within the tube is exposed to the flow of heated carbon dioxide for a period of about 15 to 20 hours. (Spinel contact with the heated carbon dioxide may advantageously be between about 1 and 20 hours.) At the end of the treatment, the treated spinel powder in each sample is cooled to room temperature before it is taken out of the tube to avoid re-oxidation. The cobalt acetate treated spinel subsequently treated with $CO_2$ is reported as Sample 7B (Table 7) and the lithium acetate treated spinel subsequently treated with $CO_2$ is reported as Sample 7C.

A comparison sample (7A in Table 7) is prepared by immersing spinel powder of same above referenced stoichiometric formula and same average particle size in a solution of lithium hydroxide at ambient conditions to coat the spinel particles with lithium hydroxide and then heating the solution to boil off water leaving behind a wet lithium hydroxide coating on the particles. This sample is then subsequently treated with heated carbon dioxide under the conditions above described.

TABLE 7

| Sample | Types of surface Coated Spinels[1] | Spinel Capacity Loss (percent) (After one week Charge storage at 60° C.) | Spinel Capacity Loss (percent) (After one week Discharge storage at 60° C.) |
|---|---|---|---|
| 7A | LiOH | 10.7 | 12.9 |
| 7B | Cobalt acetate | 18.8 | 0.0 |
| 7C | Lithium acetate | 12.5 | 13.8 |

Notes:
[1]All spinels were subsequently treated with heated carbon dioxide.

EXAMPLE 8

The following example illustrates treatment of spinel first with cobalt acetate and then lithium hydroxide followed by treatment with heated carbon dioxide:

Spinel having the stoichiometric formula $Li_{1.05}Mn_2O_{4.2}$ is ground to a powder having an average particle size of 50 micron. Samples of the spinel powder are stirred into a cobalt acetate solution under ambient conditions to saturate the spinel powder with acetate solution. Then LiOH solution is added to the spinel/cobalt acetate solution and the solution is stirred. The molar ratios of spinel to Co and Li in each solution are 0.95 and 0.92 respectively. The solution is then heated to boil off water from the solution leaving behind a wet acetate coating on the spinel particles. The spinel particles are then heated on a hot plate to remove all excess water leaving behind a dry acetate coating on the particles. The dry acetate coated spinel powder is then placed in an open stainless steel tray which is inserted into an alumina ($Al_2O_3$) tube of 4 inch (10.2 cm.) diameter. Carbon dioxide gas at a temperature between about 200° C. and 450° C. at about atmospheric pressure is passed through the tube and contacts the lithium hydroxide coated spinel particles. (The carbon dioxide gas may be at a temperature of between 200° C. an 700° C., when it contacts the spinel particles.) The carbon dioxide is passed at a flow rate of about 1 liter/min. The spinel within the tube is exposed to the flow of heated carbon dioxide for a period of about 15 to 20 hours. (Spinel contact with the heated carbon dioxide may advantageously be between about 1 and 20 hours.) At the end of the carbon dioxide treatment, the flowing gas is swtiched to zero grade dry air and the spinel is further treated at a temperature between about 200° C. and 450° C. for another 20 hours. After the dry air heating step, the spinel powder is cooled to room temperature. The cobalt acetate and LiOH treated spinel subsequently treated with carbon dioxide and air is reported as Sample 8C (Table 8).

Two comparison samples (8A and 8B in Table 8) are prepared as follows. Sample 8A is prepared by immersing spinel powder of same above referenced stoichiometric formula and same average particle size in a solution of lithium hydroxide at ambient conditions to coat the spinel particles with lithium hydroxide and then heating the solution to boil off water leaving behind a wet lithium hydroxide coating on the particles. This sample is then subsequently treated with heated carbon dioxide under the conditions above described. Sample 8B is prepared with a procedure identical to that of sample 7B in example 7 wherein the spinel powder is first treated with cobalt acetate solution followed by treament with carbon dioxide.

TABLE 8

| Sample | Types of surface Coated Spinels[1] | Spinel Capacity Loss (percent) (After one week Charge storage at 60° C.) | Spinel Capacity Loss (percent) (After one week Discharge storage at 60° C.) |
|---|---|---|---|
| 8A | LiOH | 10.7 | 12.9 |
| 8B | Cobalt acetate | 18.8 | 0.0 |
| 8C | LiOH plus Cobalt acetate | 7.0 | 7.1 |

Notes:
[1]All spinels were subsequently treated with heated carbon dioxide.

Although the present invention has been described with reference to specific embodiments, it should be understood that variations are possible without departing from the scope and concept of the invention. Accordingly, the present invention is not intended to be limited to the specific embodiments described herein, but is defined by the claims and equivalents thereof.

What is claimed is:

1. A method of treating lithium manganese oxide particles of spinel structure represented by the stoichiometric formula $Li_xMn_2O_{4+d}$ (0.9<x<1.2 and 0<d<0.4) comprising the steps of:

a) treating said lithium manganese oxide particles with at least one water soluble metal salt of a carboxylic acid to form a coating of said metal salt on the surface of said particles, and b) heating said treated lithium manganese oxide particles in an atmosphere comprising carbon dioxide gas.

2. The method of claim 1 wherein the water soluble metal salt comprises a water soluble transition metal salt of a carboxylic acid.

3. The method of claim 1 wherein the heating with carbon dioxide in step b) is accomplished at a temperature between 200° C. and 700° C.

4. The method of claim 3 where the heating in step (b) is done for a period between about 1 and 20 hours.

5. The method of claim 1 wherein the step (a) of treating said lithium manganese oxide spinel particles comprises the steps of immersing said lithium manganese oxide spinel particles in an aqueous solution comprising at least one metal salt of a carboxylic acid to form a mixture and heating said mixture to evaporate water therefrom leaving behind particulate lithium manganese oxide of spinel structure coated with said metal salt.

6. The method of claim 1 wherein said metal salt comprises a water soluble metal salt of a carboxylic acid selected from the group consisting of water soluble transition metal salt of acetic, benzoic, lactic, oxalic and formic acids, and mixtures thereof.

7. The method of claim 1 wherein said metal salt is selected from the group consisting of manganese, nickel, cobalt, iron, zinc, silver and copper salts of acetic acid., and mixtures thereof.

8. The method of claim 1 wherein said metal salt is selected from the group consisting of manganese, cobalt, zinc, and silver salts of benzoic acid, and mixtures thereof.

9. The method of claim 1 wherein said metal salt is selected from the group consisting of manganese, iron, silver and copper salts of lactic acid, and mixtures thereof.

10. The method of claim 1 wherein said metal salt is selected from the group consisting of manganese, nickel, cobalt and iron salts of oxalic acid, and mixtures thereof.

11. The method of claim 1 wherein said metal salt is selected from the group consisting of copper, iron, cobalt, nickel, manganese, zinc, and lead salts of formic acid, and mixtures thereof.

12. The method of claim 1 comprising the step of also treating said lithium manganese oxide particles with an alkali metal hydroxide prior to treatment with carbon dioxide.

13. The method of claim 12 wherein said metal salt in step (a) comprises a water soluble transition metal salt of a carboxylic acid.

14. The method of claim 12 wherein the alkali metal hydroxide comprises lithium hydroxide.

15. The method of claim 14 wherein the metal salt comprises cobalt acetate.

16. The method of claim 1 wherein the atmosphere comprising carbon dioxide comprises carbon dioxide and air.

17. In a lithium-ion rechargeable cell of the type having a negative electrode and a positive electrode wherein lithium ions (Li+) transfer from the positive electrode to the negative electrode during cell charging and from negative electrode to positive electrode during cell discharge, the improvement comprising:

the positive electrode of said cell comprising lithium manganese oxide of spinel structure treated by the method of claim 1.

18. A method of treating lithium manganese oxide particles of spinel structure represented by the stoichiometric formula $Li_xMn_2O_{4+d}$ ($0.9<x<1.2$ and $0<d<0.4$) comprising the steps of:

a) treating said lithium manganese oxide particles with at least one water soluble metal salt of a carboxylic acid to form a coating of said metal salt on the surface of said particles, and b) heating said treated lithium manganese oxide particles in an atmosphere comprising an inert gas selected from the group consisting of argon, helium and nitrogen.

19. The method of claim 18 wherein the water soluble metal salt comprises a water soluble transition metal salt of a carboxylic acid.

20. The method of claim 18 wherein the heating with carbon dioxide in step b) is accomplished at a temperature between 200° C. and 700° C.

* * * * *